United States Patent [19]

Fosket et al.

[11] Patent Number: 4,806,935
[45] Date of Patent: Feb. 21, 1989

[54] CLOSED LOOP VELOCITY/ALTITUDE SENSOR FOR FM-CW DOPPLER RADARS

[76] Inventors: Timothy G. Fosket, 209 Comly Rd., Apt. J27, Lincoln Park, N.J. 07035; James R. Drake, 615 Madison Ct., Yorktown Heights, N.Y. 10598

[21] Appl. No.: 97,772

[22] Filed: Sep. 17, 1987

[51] Int. Cl.⁴ ............................................. G01S 13/36
[52] U.S. Cl. ..................................... 342/120; 342/122
[58] Field of Search ............................... 342/122, 120

[56] References Cited

U.S. PATENT DOCUMENTS

| | | |
|---|---|---|
| 4,107,679 | 8/1978 | Strauch et al. |
| 4,107,681 | 8/1978 | Robertson et al. |
| 4,176,353 | 11/1979 | Pearson |
| 4,179,694 | 12/1979 | Alder |
| 4,241,346 | 12/1980 | Watson |
| 4,357,610 | 11/1982 | Kingston et al. |
| 4,427,981 | 1/1984 | Kyriakos |
| 4,468,638 | 8/1984 | Kyriakos |
| 4,503,401 | 3/1985 | Kyriakos et al. |
| 4,599,618 | 7/1986 | Haendel et al. |
| 4,682,175 | 7/1987 | Lazarus ............................ 342/165 |

*Primary Examiner*—Thomas H. Tarcza
*Assistant Examiner*—John B. Sotomayor
*Attorney, Agent, or Firm*—David L. Davis

[57] ABSTRACT

A Doppler navigation system includes an altimeter section with increased accuracy resulting from closed loop operation of signal processing portions for reflected signals including phase shift information. Quadrature processing of the reflected signal includes compensation for differences between quadrature processing channels, wherein the reflected signals are periodically processed by alternate ones of the channels. A maximum amplitude signal is forwarded by the signal processing portions to a frequency tracker of the navigation system. Periodic calibration of the altimeter section corrects for delays introduced in the signal processing portions. Effects of FM to AM conversion in a Gunn oscillator are reduced by connection of the signal processing portions to a short circuit during the calibration periods.

11 Claims, 6 Drawing Sheets

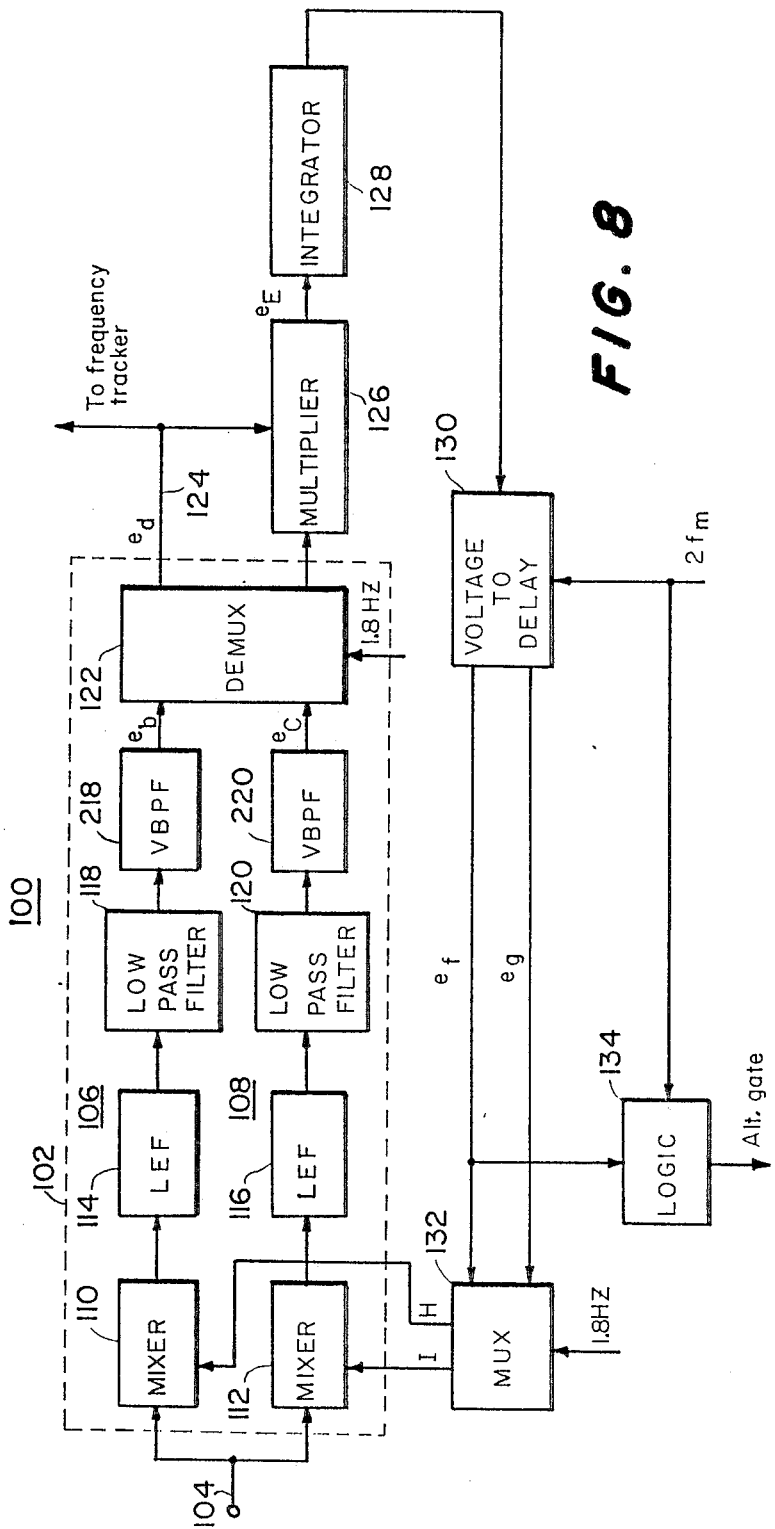

CLOSED LOOP VELOCITY/ALTITUDE SENSOR FOR FM-CW DOPPLER RADARS

TECHNICAL FIELD

This invention relates to altitude measuring devices, and more particularly to altitude measuring circuitry utilizing phase shifts in modulated signals provided in Doppler velocity sensors, and to improvements in accuracy and calibration therein.

BACKGROUND ART

Various forms of altimeters are known in the art. Some of the known altimeter structures utilize microwave signal generating systems and Doppler effect reflections thereof In one known system, disclosed in commonly assigned U.S. Pat. No. 3,860,925 to Ernest F. Darboven, Jr., there is provided a combined system including both a velocity sensor and an altitude measurement system. The altimeter portion of the combined system utilizes echoes of a frequency modulated microwave signal generated on board an aircraft for the velocity sensor, the echoes displaying a Doppler frequency shift as well as a phase shift due to travel to and from the surface of the earth. The disclosure of the above patent is incorporated herein by reference.

In the '925 disclosure there is provided an arrangement for generating a microwave signal, for transmitting the same to be reflected by the earth, and for processing the received echo. In one portion of the processing portion, there is also provided an altitude measuring system which processes the amplitude information of the returned signal to determine therefrom the altitude of the aircraft with respect to ground.

More particularly, in the Darboven patent a double side band (DSB) signal is demodulated to obtain a baseband signal and the resultant amplitudes of the two channels are measured. A block diagram summarizing the Darboven process is shown in FIG. 1. As shown therein, a double sideband signal is received at an input terminal 10 from the Doppler receiver. The signal is passed through sine and cosine channels 12 and 14. The two channels include mixers 16 and 18, respectively, wherein the received (demodulated) signals are mixed with sine and cosine signals 20 and 22, respectively. A pair of leakage elimination filters (LEF) 24, 26 is provided in the two channels, and low pass filters 28, 30 provide output signals for processing by a buffer (not shown).

In the buffer, the two sinusoids provided by the two channels, which have an amplitude difference therebetween, are processed to provide a gate signal having a gate width equal to the arctangent of the amplitude difference between the two sinusoids, thus providing a measure of the altitude of the aircraft. This operation is equivalent to division in a divider circuit 32, providing a tangent of the desired phase angle, followed by conversion by an arctan converter 34 illustrated in FIG. 1. The output of arctan converter 34 is shown as providing an output signal which is the desired altitude gate signal. The description of the two signals after the low-pass filters 28 and 30 is given by the following equations:

$$e_1 = \sin(\theta)\cos(w_D t) \quad (1)$$

and $$e_2 = \cos(\theta)\cos(w_D t) \quad (2)$$

In the above equations, the $w_D$ term is the frequency shift due to the Doppler effect, which is dependent on vehicle speed The phase term, $\theta$, is due to the time delay of the signal travelling to the ground and back. It is thus directly dependent on altitude. As shown in these equations, the altitude information exists in the relative amplitudes of the two channels. If the outputs of the two channels are divided by one another and the arctangent of the quotient is taken, the phase delay of the echo can then be determined and the altitude obtained.

This method, however, suffers from problems of accuracy. The amplitude terms have to be measured with extreme precision to obtain good altitude accuracy. Analysis has shown that this cannot be done with sufficient precision to meet the accuracy requirements of current applications in a cost effective manner.

Inasmuch as various phase shifts are introduced into the above described system by microwave and RF circuitry used therein, a calibration mode is needed to compensate for such phase shifts Two prior art methods have been used to calibrate the altimeter.

The first involves opening all the microwave switches connecting the receiver/transmitter to an antenna, so that the microwave energy is reflected back into the receiver instead of being transmitted to the ground. Since the signal thus reflected to the receiver possesses no Doppler shift, a RF modulator is required to create an artificial shift therein. This is done because the altimeter, operating in conjunction with a Doppler velocity measurement, requires a Doppler shift to operate. The RF modulated signal can now be fed into the altimeter.

The resultant phase shift measured by the altimeter is thus only that which is caused by the microwave circuitry. To obtain a corrected altitude measurement, the phase shift measured by this process may be subtracted from the total phase shift measured in the Doppler ground return signal obtained during operation of the altimeter, since the Gunn oscillator sees the same signal during the calibrate mode as during the normal operating more.

However, although this method is an accurate approach to calibration of a Doppler altimeter, the prior art implementation of this approach is expensive and bulky. That is, in the prior art it is required to provide an RF modulator and other microwave circuitry to implement such calibration, which increases both expense and equipment requirement for implementation.

A second calibration method involves measuring the phase of a microwave leakage term to obtain a calibration factor. This method is also described in the Darboven patent. The leakage term results from the receiver picking up energy reflected from the microwave switches before it has been beamed to the ground. The result, once again, is a signal without a Doppler shift, with a phase shift which should be dependent only on microwave circuitry. This phase is measured and is then used as a calibration correction factor.

More particularly, for such calibration the signal from the receiver is passed through a bandpass filter which selects the upper, $J_1$, sideband. The signal is demodulated in a sine-cosine manner in a pair of demodulators to eliminate the $J_1$ leakage component. Switched capacitor filters, composed of switching matrices and low pass filters, reject the zero speed leakage term which is used for calibration purposes Although this method is very simple and requires little extra circuitry, testing of this technique has found a number of accuracy problems therein Another prior art atimeter, utilizing phase shifting of returned Doppler signals, is discosed in prior U.S. Pat. No. 3,111,667. This method is generally referred to as "doubling," and is illustrated by the block diagram shown in FIG. 2. The double-sideband (DSB) signal that is received at terminal 36 from the antenna is first demodulated to baseband at demodulator 38, so that the leakage term will now be at DC. This term is removed by a leakage elimination filter 40 before further processing is done. The resultant signal is remodulated by a remodulator 42 to again form a DSB signal, only now without the leakage. This double-sideband signal is described by $$e_3 = \cos[(w_m + w_D)t + \theta] + \cos[(w_m - w_D)t + \theta] \quad (3)$$

The $w_m$ term is the frequency which is used to frequency modulate the microwave Gunn oscillator (commonly referred to as the FM frequency). Upon passing this signal through a frequency doubling device 44, there is provided a signal given by $$e_4 = 1 + \cos[2(w_m + w_D)t + 2\theta] + \cos[2(w_m - w_D)t + 2\theta] + \cos[2w_m t + 2\theta] + \cos[2w_D t] \quad (4)$$

The signal described in equation (4) is sent through a narrow band filter 46, centered at $2w_m$, resulting in a reconstructed carrier having a phase which is proportional to altitude. The phase of the reconstructed carrier is measured by comparing the signal to the same signal $w_m$ that was used to frequency modulate the Gunn oscillator. This is done in a loop by using a phase detector 48, together with a phase shifter 49 in a loop as shown in FIG. 2.

In the above described frequency doubling approach, the output of the phase detect or 48 is amplified to derive a motor 50, the output shaft of the rotates to drive the phase shifter 49. The displacement of the output shaft of the motor constitutes the altimeter output quantity, representing the altitude multiplied by a constant.

A significant disadvantage of the above described frequency doubling method is in the accuracy thereof, due to the fact that much circuitry is involved and that any phase imbalance in this circuitry degrades accuracy. Moreover, in view of the prior art use of a loop only in the output phase detection and indication portion of the circuit, while performing all other processing in an open-loop fashion, accuracy of procesing of the signals is further compromised. Another problem with the prior art is the requirement of a demodulator-remodulator circuit before the doubler to eliminate the leakage term. This requires a considerable amount of additional circuitry.

Thus, the prior art has been deficient in providing an accurate, inexpensive, altimeter utilizing reflected Doppler signals generated for velocity measurements. Moreover, where calibration has been proposed, significant additional circuitry has been required. There is thus a need in the prior art for an accurate, calibrated, altimeter which does not utilize extensive amounts of additional circuitry.

DISCLOSURE OF INVENTION

It is accordingly an object of the present invention to overcome the difficulties of the prior art and to provide an improved altitude measurement device utilizing reflected Doppler shifted signals provided for other navigational measurements.

It is a more specific object of the invention to provide an altitude measurement system wherein a closed loop altitude measurement circuit is provided for accurately processing, in a closed loop manner, demodulated reflected signals exhibiting a Doppler shift.

Yet another object of the invention is to provide a closed loop Doppler altitude measurement circuit including quadrature channels and including an arrangement for compensating for differences between the quadrature channels by alternating the quadrature signals processed by the channels.

It is a further object of the invention to provide a combined Doppler velocity and altitude measuring system for an aircraft, wherein a closed loop altitude processing section provides a maximum amplitude signal to a velocity processing section to increase the accuracy thereof.

It is an additional object of the invention to provide simplified calibration circuitry for an attitude processing circuit having an increased accuracy of calibration of a phase shift introduced in the altitude processing portion of a Doppler velocity and altitude measuring system.

Still another object of the invention is to increase the accuracy of a closed loop altitude measuring portion of a processing section for reflected Doppler shifted signals by providing bandpass filters in the closed loop.

In accordance with these and other objects of the invention, there is provided an improvement in a Doppler radar navigational system. The improvement includes a closed loop altitude measuring circuit, which includes a controllable delay for establishing a loop phase shift within the closed loop circuit, and a control circuit for controlling the controllable delay to establish a loop phase shift corresponding to a relative phase shift between a modulated signal transmitted by the navigational system and a reflected signal received thereby. Additionally, there is provided logic circuitry for providing an output signal representative of the loop phase shift established by the controllable delay.

Advantageously, system expense is reduced by using certain signal processing circuitry commonly with the navigational system. Moreover, system accuracy is increased by including the signal processing circuitry as well as the controllable delay and the control circuit within the closed loop.

Preferably, the control circuit causes the controllable delay to establish the loop phase shift to be substantially equal to the relative phase shift. Moreover, the logic circuitry includes an arrangement for providing an altitude gate signal having a duration corresponding to the loop phase shift.

Further, the closed loop circuit includes first and second channels for processing first and second quadrature signals, and a multiplier for multiplying the first and second quadrature signals, as processed by the first and second channels, for providing an output signal corresponding to the product obtained thereby. Additionally, the control circuit includes processing means for processing the output signal of the multiplier to provide a control voltage to the controllable delay for establishing the loop phase shift.

The processing means may include an integrator for the output signal of the multiplier.

In a more specific aspect of the invention, the controllable delay provides the first and second quadrature signals, each modulated at a modulation frequency and each exhibiting the loop phase shift established by the controllable delay. The modulation frequency may be twice the modulating frequency of the modulated Doppler radar beam.

Preferably, the arrangement includes a switched multiplexer for alternately providing the first and second quadrature signals to the first channel while simultaneously alternately providing the second and first quadrature signals, respectively, to the second channel Thus, the inventive arrangement repeatedly alternates the channels processing the first and second quadrature signals to eliminate permanent differences therein arising from differences in the components of the two channels Switching means is provided for switching the multiplexer Similarly, a switched demultiplexer receives the alternating processed quadrature signals from the first and second channels The demultiplexer provides first and second output signals corresponding to a first and second of the quadrature signals output by the controllable delay. The switched demultiplexer is preferably connected to be switched by the switching means in synchronism with the multiplexer. Thus, when the loop phase shift substantially matches the relative phase shift the first output signal is a signal which is always at a high amplitude, and the second output signal is a signal which is always at a lower amplitude than the first signal. The multiplier is connected to receive the first and second output signals from the demultiplexer for providing the output product signal.

Additionally, means is provided for coupling the first output signal, having a high amplitude when the loop phase shift substantially matches the relative phase shift, to a frequency tracking portion of a velocity processing circuit of the Doppler navigational system, thereby improving the accuracy of the velocity processing circuit thereof In another facet of the invention, the first and second channels each includes a variable bandpass filter to increase the accuracy of processing.

In accordance with a significant feature of the invention, there is provided a calibrating circuit for calibrating the output signal in order to compensate for phase shifts caused by components other than the controllable delay included in the loop phase shift.

Preferably, the calibrating circuit includes a switching structure for disconnecting a microwave generator from an antenna used to transmit microwave energy in the Doppler radar navigational system. A delay measurement circuit is provided for measuring a delay between the microwave energy reflected at the disconnected microwave generator and the microwave energy generated by the microwave generator. Finally, a correction circuit corrects the output signal by subtracting the measured delay from the loop phase shift indicated by the output signal.

Advantageously, the calibrating circuit further includes a microwave delay line followed by a RF short circuiting element. Accordingly, the switching structure is operable for connecting the microwave generator to the short circuiting element for measuring the delay. This arrangement is provided for correction of FM to AM conversion by the microwave generator.

Moreover, a timer is provided for periodically activating the switching structure and the delay measurement circuit. This arrangement is utilized to cause periodic measurements of the delay and to provide periodic calibration of the altitude measuring circuit.

Other objects, features and advantages of the present invention will become readily apparent to those skilled in the art from the following description wherein there is shown and described a preferred embodiment of the invention, simply by way of illustration and not of limitation of the best mode (and alternative embodiments) for carrying out the invention. The invention itself is set forth in the claims appended hereto. As will be realized upon examination of the specification with due reference to the drawings, the present invention is capable of still other, different, embodiments and its several details are capable of modifications in various obvious aspects, all without departing from the invention which is recited in the claims. Accordingly, the drawings and the descriptions provided herein are to be regarded as illustrative in nature and not as restrictive of the invention

BRIEF DESCRIPTION OF DRAWINGS

The accompanying drawings, incorporated into and forming a part of the specification, illustrate several aspects of the present invention and, together with the description, serve to explain the principles of the invention. In the drawings

FIG. 8 shows a modification of the embodiment of FIG. 4; and

BEST MODE FOR CARRYING OUT THE INVENTION

In accordance with the objectives of the invention hereinabove set forth, there is provided a closed loop processing arrangement for returned Doppper echoes in a Doppler navigation system. Prior to describing the inventive arrangement, the following is provided as a brief explanation of the geometry of the transmitted and received beam in a Doppler navigation system.

One known Doppler radar system operates by transmitting four sequentially switched beams of frequency modulated RF energy at the ground, and receiving the Doppler shifted returns. The return echo of this FM-CW radar beam contains the FM carrier frequency and sidebands at multiples of the FM frequency. Velocity and other navigational information is obtained by analysis of the returning beam, and particularly by measuring the Doppler shift in the first (JI) sideband. In addition to the Doppler frequency shift, the sideband also contains a phase shift due to the travel time from the radar to ground and back to radar. This phase shift is directly proportional to altitude, as follows.

Figure 3:
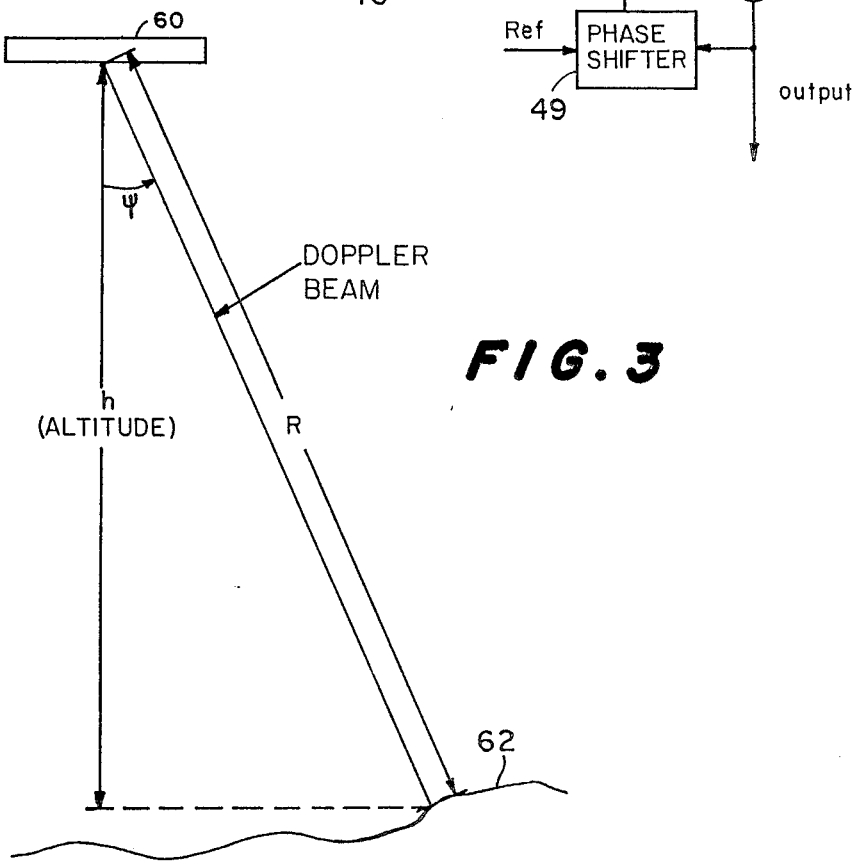
FIG. 3 shows a geometrical relationship between a transmitted Dopper navigation beam and aircraft altitude.

FIG. 3 shows one of the four beams of the Doppler system transmitted at a slant, or inclination, angle $\Psi$ to the vertical by a receiver/transmitter unit 60. The beam travels a distance R and is reflected by ground, 62. The round trip time of the RF energy is 2 R/C where C is the speed of light. Altitude, h, is related to slant range by:

$$h = R \cos \Psi \qquad (5)$$

and thus $$h = (C \Delta T \cos \Psi)/2 \qquad (6)$$

The $\Delta T$ term is a phase shift in the Doppler return relative to the transmitted signal. This phase shift, $\Delta \theta$, is given by $$\Delta \theta = 2\pi f_m \Delta T_{13} \qquad (7)$$

so that $$h = (C \cos \Psi)(\Delta \theta)/(4\pi f_m) = K \Delta \theta \qquad (8)$$

The coefficient K is a known constant for any given Doppler system, so that altitude is equal to a constant times the measured phase shift. Thus, the Doppler return contains information (phase shift) which is usable to measure altitude.

Unlike a separate altimeter, a unit which is combined with a Doppler navigation system enjoys a number of advantages. Thus, the velocity processing circuitry and the altimeter circuitry both use the same antenna circuitry (RF source, R/T module, microwave switches and antenna). The RT module can be designed to provide both SSB (single side band) and DSB outputs The SSB output is used for velocity measurement, while the DSB is sent to the altimeter for altitude measurement.

Figure 4:
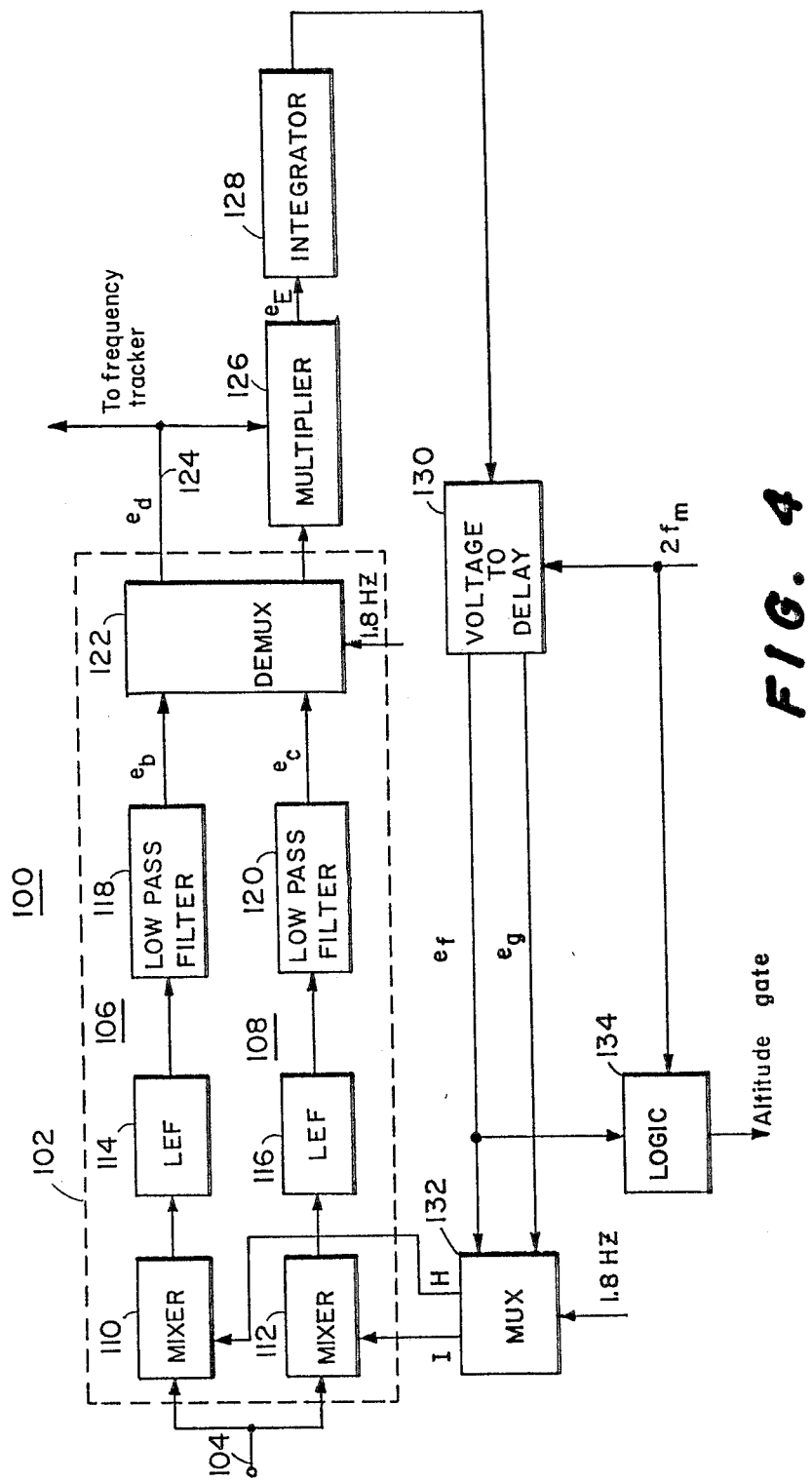
FIG. 4 shows a block diagram of an atimeter portion of a Doppler system in accordance with the present invention.

A block diagram of the inventive type of closed loop altimeter is shown in FIG. 4 and is generally indicated by reference numeral 100. It should be recognized that the inventive arrangement, although self contained and capable of operating independently of other processing circuitry, is intended to operate in conjunction with a Doppler navigation and velocity measuring system.

Accordingly, the illustrated embodiment of the invention includes a signal processing portion 102 which is common with the velocity navigation system. Therein, a reflected DSB signal is receive at a terminal 104 for processing by first and second quadrature processing channels 106 and 108. The two channels are substantially identical, including therein mixers 110 and 112 of mixing the received signal with switched quadrature feedback signals to be described later. The mixer outputs are provided t LEF's 114, 116 and low pass filters 118, 120.

The output signals from filters 118 and 120 are demultiplexed by demultiplexer (demux) 122, operating in response to a switching signal preferably of 1.8 Hz. As will be understood from the following description, the two output signals from demux 122 provide signals varying with the return Doppler shift frequency and having amplitudes which are proportional to the sine and cosine, respectively, of a difference between a loop phase shift developed in the altimeter and the phase difference of the DSB signal and the originally transmitted signal.

As will be further appreciated, when the loop is closed, the phase of the feedback signal is driven to equal the phase of the incoming double-sideband signal, so that the above noted phase difference approaches zero. Accordingly, under this condition the magnitude of one of the output signals output by demux 122 will always be higher than the magnitude of the other and will permit more accurate detection of the Doppler phase shift frequency therein. Accordingly, this signal is coupled by output line 124 to a frequency tracker of the Dopper navigation system (not shown).

The lwo output signals from pemux 122 are multiplied by a multiplier 126, to provide an output signal varying as the sine of twice the above noted phase difference and having a time varying component varying at twice the return Doppler shift frequency. This signal is integrated by an integrator 128, to eliminate the time variation thereof and to provide a control signal having a voltage varying as a function of the phase difference.

A voltage-to-delay converter, or controllable delay, 130 is controlled by the control signal output by integrator 128 to provide output signals having a controllable phase shift. More particularly, a double modulating signal at twice the modulating frequency of the Doppler signals is also input to the controllable delay, which provides two output signals varying respectively as the sine and cosine of the modulating frequency and phase shifted therefrom by a loop phase shift generated in response to the control signal. To close the loop, the two signals output by the controllable delay 130 are fed back to mixers 110 and 112.

However, in order to avoid always processing the sine signal output by delay 130 in one of the two channels, e.g., 106, and always processing the cosine output in the other, e.g., 108, a multiplexer 132 is provided. Multiplexer 132 is controlled by a switching signal as is demux 122, at 1.8 Hz. The switching signal causes multiplexer 132 to alternate the outputs thereof, so that during one half of the 1.8 Hz cycle a first output of delay 130 is passed on to first channel 106 and the second output of delay 130 is passed on to the second channel 108. During the second half of the 1.8 Hz cycle, the second output of delay 130 is passed on to the first channel 106 while the first output is passed on to the second channel 108.

Inasmuch as demux 122 is similarly switched, during the first half of the 1.8 Hz cycle the signal from one of the two channels is passed on to output line 124 while during the second half of the 1.8 Hz cycle the signal from the other of the two channels is passed on to the output line 124. Thus the above arrangement permits the signal varying as the cosine of the phase difference, processed by either channel 106 or 108, to be passed on to output line 124 and to the frequency tracker, as if neither the switched multiplexer 132 nor the switched demux 122 were in the circuit.

However, by including both the switched multiplexer 132 and the switched demux 122 in the processing circuitry, it is seen that any discrepancies between the channels are shared equally between the processed signals. Thus, neither of the two signals is continuously affected only by characteristics of one channel. Both signals are substantially equally affected by both channels, adding to the accuracy of the improved system according to the invention.

Another facet of the invention is illustrated by logic circuit 134. More particularly, one of the feedback signals generated by controllable delay 130 is processed together with the input double modulating frequency signal to provide a gate signal having a duration proportional to the loop phase shift and thus to the vehicle altitude. Since this feedback signal is a square wave, an altitude gate signal can easily be generated. The altitude gate is then converted to an altitude number by use of an oscillator and counter.

Operation of the loop of FIG. 4 is as follows. The double-sideband signal is represented by equation (9):

$$DSB\ in = \cos[(w_m+w_D)t+\theta] + \cos[(w_m-w_D)t+\theta] + \cos[(w_mt+\theta)], \quad (9)$$

where the first and second terms represent the DSB signal and the third term represents a leakage term.

The input DSB signal is mixed with the feedback signals in mixers 110 and 112. As above noted, the feedback signals consist of two quadrature terms at the FM frequency, having a controllable phase. The two quadrature terms are flipped back and forth at a 1.8 Hz rate in order to cancel out any mismatches in the two channels 106 and 108. This mixing results in the leakage term being at true DC, which is blocked by leakage elimination filters 114 and 116.

Low-pass filters 118, 120 are used to remove the sum terms that result from the mixing process The form of the output signals of the low pass filters is shown in equations 10 and 11.

$$e_b = \sin/\cos(\theta_{loop}-\theta)\cos(w_D t) \quad (10)$$

$$e_c = \cos/\sin(\theta_{loop}-\theta)\cos(w_D t) \quad (11)$$

In the above equations, the slash indicates that the sine and cosine (Eq. 10) or the cosine and sine (Eq. 11) terms are alternated. As shown, both signals contain the cosine of the Doppler frequency. However, the amplitude of one of the signals being processed is proportional to the sine of the phase difference between the input and the feedback signals, while the amplitude of the other signal being processed is proportional to the cosine of the phase difference. Thus, when the loop is closed and the phase difference is driven to zero, the amplitude of one channel is driven to a maximum, and that of the other channel is driven to a minimum The two channels are again flipped back and forthat a 1.8 Hz rate in pemux 122, so that the signal sent Lo lhe frequency tracker for the velocity determining portion of the Doppler system is always the maximized channel, is described in equation (12).

$$e_d = \cos(\theta_{loop}-\theta)\cos(w_D t) \quad (12)$$

The two channels are now multiplied together by multiplier 126 to form an error term, described in Equation (13).

$$e_E = [1+\cos(2w_D t)]\sin[2(\theta_{loop}-\theta)] \quad (13)$$

Equation (13) shows that the error term has both AC and DC components. This error term is fed into integrator 128, which eliminates the AC component and integrates the DC component of the error term. The output of the integrator is a voltage representing the phase shift being fed back to the input mixers. This voltage is converted to a phase shift in the voltage-todelay circuit 130. The output of the circuit 130 consists of the two quadrature terms shown in equations (14) and (15).

$$e_f = \sin(w_m t + \theta_{loop}) \quad (14)$$

$$e_g = \cos(w_m t + \theta_{loop}) \quad (15)$$

These signals are flipped back and forth by multiplexer 132 which alternately provides the signals $e_f$ and $e_g$ to each of the two channels, as previously described. The result of closing the loop is that the feedback phase term, $\theta_{loop}$, is driven to equall the incoming phase $\theta$.

It should be recognized that the preceding pure sinusoidal representations are for purposes of illustration. The hardware, however, produces square waves. Thus, the voltage-to-delay converter generates two square waves in quadrature at the FM frequency with a delay proportional to the integrator voltage. The flipping of the quadrature is signals is done at a 1.8 Hz rate.

The main advantage of this invention over previous implementations is the ability of the present circuit to deliver accurate performance without excessive amounts of hardware. The high accuracy is achieved by using a closed-loop approach. In this implementation, the accuracy of the system is established primarily in the quadrature mixers 110 and 112 at the input of the altimeter loop. The major error contributor is the' quadrature error in the mixing signals, which can be controlled to be very small. Any gain variations and phase shifts within the loop may affect the frequency response of the loop, but will not introduce errors in the attitude measurement.

Another advantage of this invention is that the maximized channel of the altimeter loop is sent to the frequency tracker for tracking of the Doppler shift. Other methods have required the two channels to be summed, or have demodulated and then remodulated the DSB term in order to generate a SSB term for the frequency tracker Both these methods result in a 3 db loss in signal-to-noise ratio, while using the maximized channel in the present invention results in no such loss.

Two enhancements to the tracking loop may be easily implemented. The first is a method to improve the accuracy still further an, even more, to improve fluctuation performance. more particularly, variable band-pass filters are used instead of the low-pass filters 118, 120 of FIG. 4.

In accordance with this approach, the center frequency of the filter is set by information from the frequency tracker. The reason for this is to improve the S/N ratio of the product signal $e_E$ coming out of the multiplier 126. Using low-pass filters, the two multiplier inputs each have a bandwidth of about 9 Khz in order to accommodate the Doppler shifts expected at the maximum aircrafL veloCiLies. Using a band-pass filter centered at the Doppler frequency, this bandwidth can be reduced to about 1 Khz. The S/N improvement out of the multiplier results in less altitude fluctuation and improved accuracy performance. The prior art has attempted to achieve similar results. However, in the prior art such attempts require the use of a second mixer running at the Doppler frequency, followed by a low-pass filter. In the present invention, however, the use of the proposed bandpass filter, a method that has only recently become feasible, is more cost and space effective.

Figure 9A:
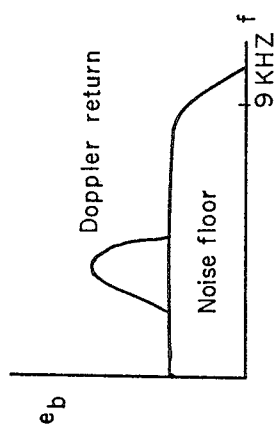
FIGS. 9a-9f show frequency spectra at various points in the embodiment of FIGS. 4 and 8.
Figure 9B:
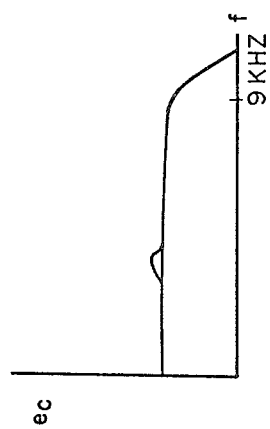
Figure 9C:
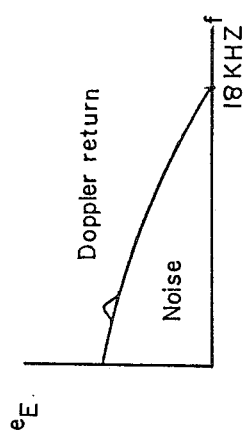
Figure 9D:
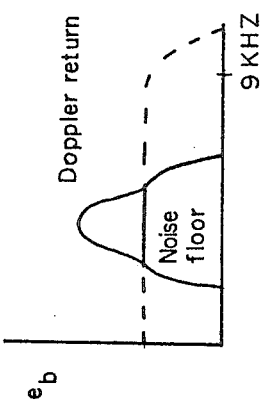
Figure 9E:
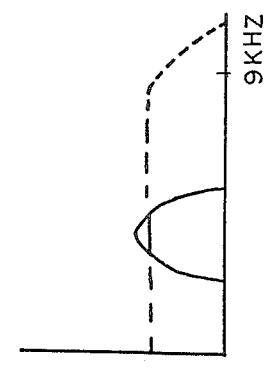
Figure 9F:
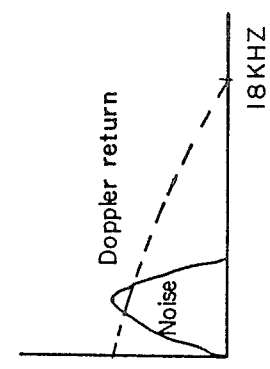

Referring now to FIG. 8, there is shown an arrangement wherein variable band-pass filters (VBPF) are included in the embodiment of FIG. 4. Specifically, VBPF's 218 and 220 are included following the low-pass filters 118 and 120. The frequency spectra of the voltages $e_B$ and $e_C$ at the input to demux 122, and of the voltage $e_E$ output from the multiplier 126, are illustrated in FIGS. 9a–9f. FIGS. 9a–9c illustrate the spectra of the signals $e_B$, $e_C$ and $e_E$ for the embodiment of FIG. 4, while FIGS. 9d–9f show the spectra of the same signals for the modified embodiment of FIG. 8.

As shown therein and as hereinabove described, the bandwidth of the signals provided to the multiplier is approximately 9 KHz, inasmuch as the frequency of the Doppler signals may be anywhere from zero to 8 KHz, as a function of vehicle velocity. After multipliation of the two Channels, the noise bandwidth is in the range of 0–18 KHz. Only the Doppler signal contains useful information, however, while the noise merely generates undesirable random fluctuations. Additionally, the undesired noise signals may also cause bias errors in the multiplier.

The approach taken to lessen the effects of Lhe noise in the embodiment of FIG. 8 is to filter the noise out of the signal prior to input to the multiplier. Since the frequency tracker used with the invention has available information on the particular Doppler frequency, this information is provided to a VBPF so that the center frequency thereof may be adjusted to equal that of the Doppler signal.

The results of this approach are shown in FIGS. 9d–9f. As seen therein, the resulting noise bandwidth shows considerable reduction.

Another possible improvement of the arrangement of FIG. 4 involves modifying the altimeter loop to work down to zero velocity. The loop of FIG. 4, however, might have problems working down to zero velocity because the leakage term after mixers 110 and 112 is at DC. This DC component is blocked in the LEF circuitry, which is basically a high-pass filter whose low frequency cutoff is selected such that the lowest Doppler frequency is passed.

Figure 1:
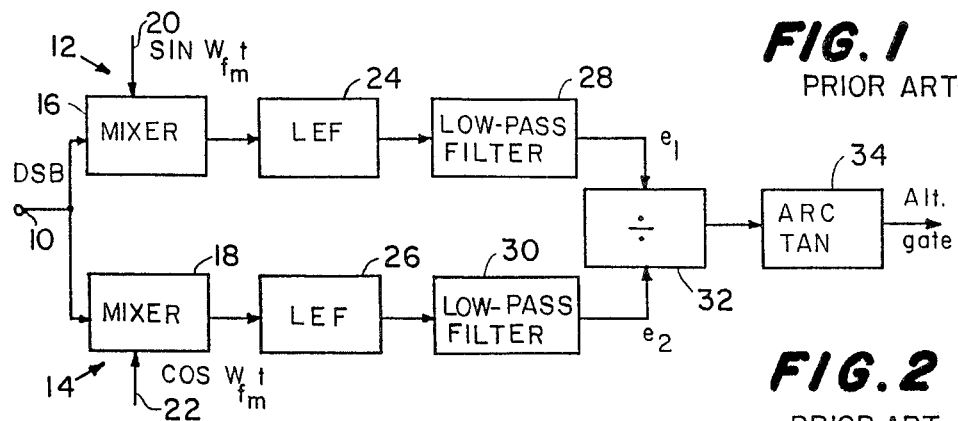
FIG. 1 shows a prior art approach to providing altitude measurements with a Doppler navigation system.
Figure 2:
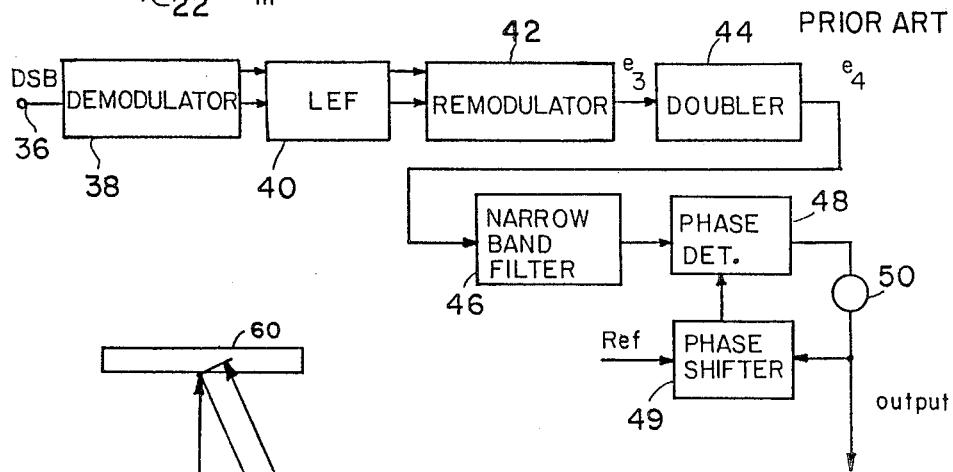
FIG. 2 shows another prior art approach to providing altitude measurements with a Doppler navigation system.

In actual practice, however, the phase of the feedback signal processed in the mixers is being varied, thus causing modulation of the DC leakage signal. When the minimum Doppler frequency is high, this is not a problem, since the low frequency cutoff of the high-pass filter can be made higher to filter out all the leakage. When working down to zero velocity, however, this is not possible. One possible solution is to incorporate a circuit including a demodulator, LEF and remodulator, as shown in the front end of FIG. 2. Because the phase of the mixing signal in the demodulator would be constant, leakage would be exactly at DC. The output of this circuit would be a double sideband signal with leakage removed. This signal could now be input into the altimeter loop for processing.

Figure 5:
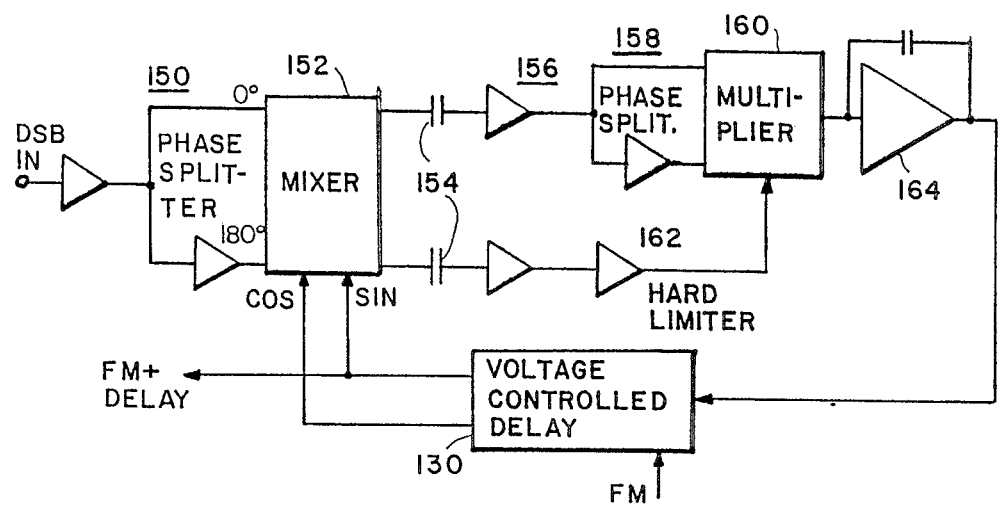
FIG. 5 shows an alternate embodiment of the invention.

Referring now to FIG. 5, there is illustrated another, simplified, embodiment of the invention, exclusive of the channel switching arrangement. Thus, the input DSB signal is passed by a phase splitter 150 to a mixer portion 152 for mixing with the two quadrature signals generated by the controllable delay circuit 130. The leakage term is removed by AC coupling of the mixer output, using capacitors 154. The resultant signals are provided to a low pass filter section 156, which is provided in order to remove sum terms from the mixer output as well as to narrow the bandwidth of the noise included in the signals.

A second phase splitter 158 provides the signal from one channel to multiplier 160 while a hard limiter 162 limits the signals provided to the multiplier from the other channel. The multiplier generates a DC error term, which is output thereby and is provided to an integrator 164. The integrator voltage, which represents the phase shift for controllable delay 130, can thus be translated to a representation of altitude.

It should be noted that in a practical Doppler system four beams are used, along with possibly two FM frequencies. Thus, the altimeter should be capable of tracking simultaneously eight independent phase shifts This is done in the present invention by time sharing the circuitry among the eight beams. To illustrate this concept, integrator 164 shows a detail not shown in the integrator 128 shown in the embodiment of FIG. 4, including therein a feedback capacitor for an operational amplifier. To integrate the eight signals independently, eight switched capacitors may be used in the integrator. Moreover, interfacing circuitry is included to convert the phase delay into a digital word for a computer controller for the system.

Alternatively, a digital embodiment may be provided for the integrator, utilizing up-down counters therefor. The controlled delay may comprise a clocked shift register, providing a coarse delay in response to the integrator, and a delay line for the output of the shift register, also responsive to the integrator, for providing fine variations in the delay. Further, hard limiting of the signals in both channels may be used to convert signals to TTL level signals, thus permitting use of a digital multiplier in the form of an Excusive-Or gate, an AND gate, or the like for providing a logic product of output signals of properly defined logic levels As hereinabove described, an altimeter requires some type of calibration circuitry to compensate for microwave and RF phase shifts. For example, tests conducted on an antenna used in one type of Doppler system show that the internal hardware delay can change up to 500 nsec with temperature. Such changes correspond to perceived changes of 230 feet in altitude which, for low altitudes, may be highly significant. Accordingly, the present invention includes automatic calibration sequences for the altimeter section added to the Doppler velocity sensing system.

Figure 6:
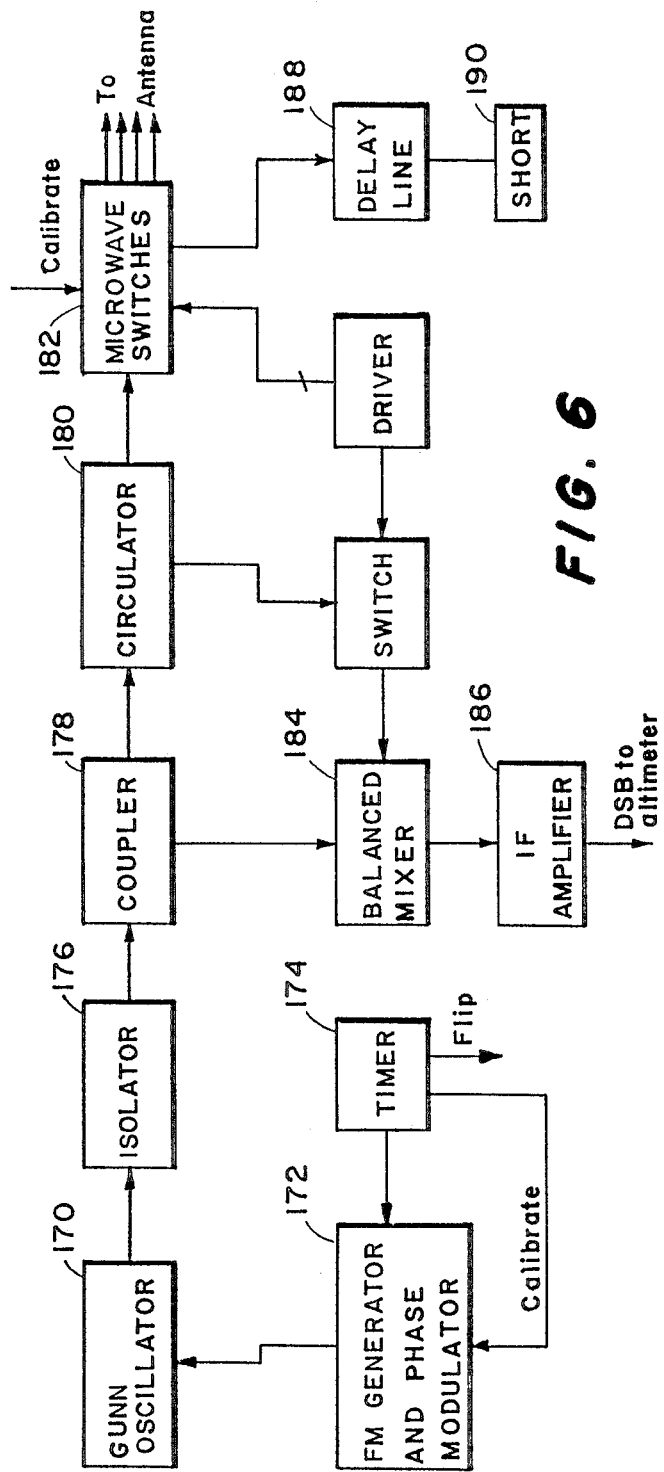
FIG. 6 shows an arrangement used to obtain a calibration factor for the inventive altimeter.

More particularly, instead of adding an RF modulator after the Gunn oscillator, it was decided to provide modulation for the FM signal transmitted to the Gunn oscillator, providing a DSB FM output signal therefrom. Amplitude or phase modulation can be used. The preferred embodiment of the present invention uses amplitude modulation. By opening the microwave switches which normally provide the output signal to the antenna, the signals are instead reflect ed to the altimeter trackign circuit of FIG. 4, where normal processing takes place. Inasmuch as the only phase shift on the signal processed during such a calibration sequence is provided by the internal hardware delays, once the closed loop processing section locks on to the phase shift the shift is stored, for use in a normal processing mode to adjust the indicated altitude A block diagram of a portion of the microwave circuitry in the receive transmit module is shown in FIG. 6. The illustrated circuit is used to calibrate the altimeter as follows. During normal altimeter operation, a 13.3 GHz output of a microwave Gunn oscillator 170 is modulated by an FM generator, forming one part of a generator and modulator 172. The FM generator transforms a FM frequency term from a timer 174, provided at a 1.8 KHz frequency, for example, into a sine wave. The sine wave is used to frequency modulate the output of Gunn oscillator 170. The microwave energy generated by oscillator 170 is sent through an isolator 176, a coupler 178 and a circulator 180, which are required for proper microwave transmission. The signal is routed to the proper antenna port by microwave switches 182.

The microwave energy is transmitted through the port to the ground, and reflected back to the port from whence it is routed back through the switch 182, circulator 180 and coupler 178. From coupler 178 the reflected signal is sent to a mixer 184 which demodulates the signal to an intermediate frequency (IF). The signal is amplified by an IF amplifier 186. The output of amplifier 186 is the DSB term which is sent to the altimeter input terminal 104 of FIG. 4.

Thus, a Considerable amount of microwave circuitry is used in operation of t he Doppler system. This circuitry adds various phase shifts to the signal being processed. As noted above, the phase shifts can and do change with time and temperature. In the calibration mode provided for measuring the changing phase shifts, a short calibration mode is entered periodically, every 10 seconds for example In this mode, the modulator portion of the FM generator 172 is turned on. This results in the FM sine wave output being modulated by a frequency from the timer. For example, a modulating frequency of 1.8 KHz may be used. Operation of the microwave circuitry is the same as described above for the normal mode of operation, up to the switches 182. Instead of being routed to an antenna port, however, during the calibrate mode the microwave energy is routed to a delay line 188 terminated in a short 190. The microwave energy travels through the delay line, is reflected by the short, and travels back through switches 182, circulator 180, coupler 178 and into the mixer 184.

The signal out of the mixer is still a DSB signal, but simulates a Doppler shift of the modulating frequency and phase shift, e.g., 1.8 KHz, as provided by FM generator and modulator 172. While the actual Doppler shift sidebands in system operation include phase shifts due both to microwave and RF circuitry and to travel time to and from the ground, the sidebands in the calibrate mode have a phase shift due only to microwave and RF circuitry. The altimeter of FIG. 4 measures this phase shift in the calibrate mode and uses the result to correct the normal mode reading, thus eliminating any internal phase shifts from the altitude indication.

Figure 7:
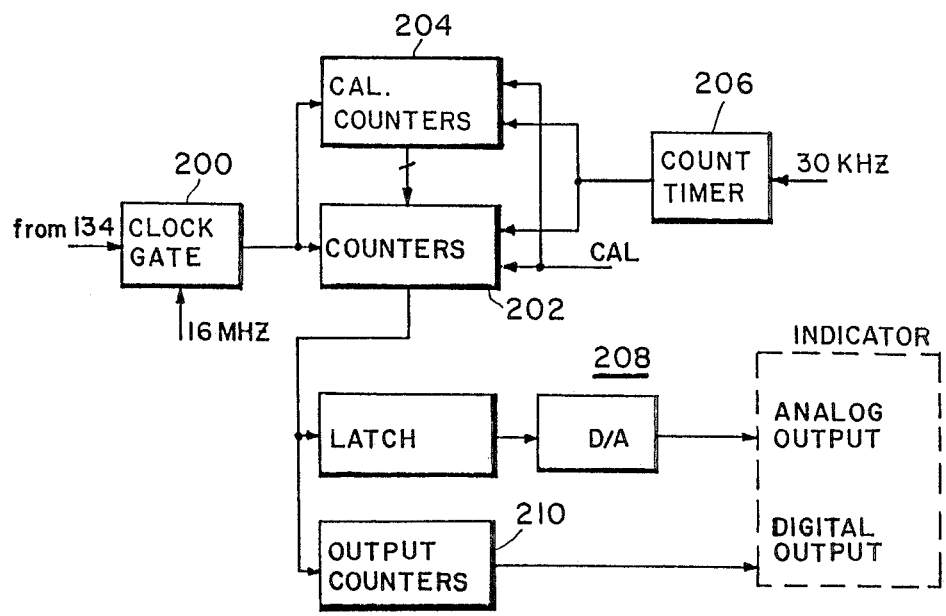
FIG. 7 shows an input/output circuit of the invention.

An input-output (I/O) module, shown in FIG. 7, provides the appropriate correction of the normal altitude counts as follows.

The function of the I/O circuit is to transform the phase loop generated by controllable delay 130, corresponding to the delay between the return signal and the transmitted signal, to a number representing altitude in feet, for example. Additionally, the I/O circuit must be capable of subtracting the calibration factor, measured during each calibration mode operation, from the altitude number. This is done by logic circuit 134, which gates the reference and delayed signals together, and forms a pulse whose width depends on this delay.

A clock gate circuit 200, which is gated by the output gate of logic circuit 134, passes a high frequency clock signal, such as 16 MHz for example, to a counter 202. Thus, the clock is counted for a time period corresponding to the delay representing the altitude. By providing an appropriate gating period in response to the loop phase shift, and by using an appropriate frequency clock signal, the count in counter 202 at the end of the time period may represent the altitude directly (1 count=1 foot) or proportionatey.

Although variation of the high-frequency clock is contemplated as obtaining the desired equivalence between the count and altitude indication, such variation is not always necessary. Thus, in the presently preferred embodiment the output of counters 202 is provided to a microprocessor (not shown), which also stores counter outputs for use in the calibration mode of operation. Subtraction of the two modes, as well as scae factor corrections, are thus al performed by the microprocessor.

A parallel counter 204 is included for storage of the calibration count. Thus, clock gate circuit 200 gates the clock signal to both counters 202 and 204. A calibrate mode signal activates one and deactivates the other of the two counters. Thus, during normal operation counter 202 is enabled and counter 204 disabled. During the periodic calibration mode operations, counter 202 is disabled and counter 204 enabled to receive the clock signal from gate circuit 200.

In that regard, it is noted that timer 174 generates all timing signals, such as the FM frequency, the 1.8 KHz calibration signal, the 1.8 Hz flipping signal and the 0.1 Hz calibrate ON signal. Thus, a number of output signals from the timer are shown in FIG. 6.

A count timer 206 is used to read out the count on counter 202. However, inasmuch as a calibration (adjustment) count is stored in counter 204, this count is subtracted from counter 202 by timer 206, causing counter 202 to count down or to subtract directly the contents of counter 204. The resulting corrected output is provided for both analog and digital display, using a latch and D/A converter combination 208 or an output counter 210.

Although similar calibration methods have been tried in the past, such previous attempts have been unsuccessful. A primary reason for the prior failure is that when the FM sine wave that is sent to the Gunn oscillator is modulated, the oscillator imparts a different phase shift to the signal than it does when no such phase modulation is used. Thus, the phase shift measured in the calibrate mode is not the same as that which exists in the normal mode. Accordingly, there results an improper calibration of the.altimeter.

Testing shows the reason for this is an inherent FM to AM conversion occurring inside the Gunn oscillator. When tests were made using Gunns with very low FM to AM conversion, calibration mode result were much better. However, it is quite expensive to produce a very low FM to AM Gunn. This invention overcomes this difficulty by adding a delay line to the microwave signal path in the calibrate mode. The effect of the error introduced by FM to A conversion on the measurement of phase shift is inversely proportional to the signal path length. It has now been shown that if a Gunn with reasonably low (rather than very low) FM to AM conversion is used in conjunction with a delay line of approximately 15 feet of cable, the calibration mode results are excellent. Reasonably low Gunns are less expensive than very low conversion Gunns, and the present invention thus reduces the cost of obtaining the calibration needed for proper altimeter operation.

As stated earlier, previous calibration methods have used a RF modulator situated after the Gunn oscillator to generate the needed modulation sidebands. Because modulation was provided after the Gunn oscillator, the FM to AM conversion did not come into play. The disadvantage of this approach is that a separate RF modulator is required, which modulator is expensive and bulky The present invention utilizes an analog phase modulator which is inexpensive and small, a reasonably low FM to AM conversion Gunn oscillator, which is only slightly more expensive than a normal Gunn, and a delay line which is also inexpensive and small. Overall, the circuitry of this invention is thus less expensive to build, more reliable and more compact than that of previous methods.

The foregoing description of the preferred embodiment of the invention has been presented for purposes of illustration and description and is not intended to be exhaustive or to limit the invention to the precise forms disclosed, since many modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated therefor. It is intended that the scope of the invention be defined by the claims appended hereto, when interpreted in accordance with full breadth to which they are legally and equitably entitled.

We claim:

1. In a Doppler radar navigational system, the improvement comprising:
    a closed loop altitude measuring circuit, including:
    controlled delay means for establishing a loop phase shift within said closed loop circuit,
    control means for controlling said controlled delay means to establish a loop phase shift corresponding to a relative phase shift between a modulated signal transmitted by the navigational system and a reflected signal received thereby, and
    logic means for providing an output signal representative of said loop phase shift established by said controlled delay means
    said closed loop circuit further including first and second channels for processing first and second quadrature signals, and
    multiplying means for multiplying said first and second quadrature signals processed by said first and second channels and for providing an output signal corresponding to the product obtained thereby, and
    said control means including processing means for processing said output signal of said multiplying means to provide a control voltage to said controlled delay means for establishing said loop phase shift.

2. An improved Doppler radar navigational system as recited in claim 1 wherein said processing means comprises integrating means for integrating the output signal of said multiplying means.

3. An improved Doppler radar navigational system as recited in claim 1 wherein said controlled delay means provides first and second quadrature signals each modulated at a modulation frequency and each having said loop phase shift established thereby, said closed loop circuit includes first and second channels for processing said first and second quadrature signals, and further comprising
    multiplying means for multiplying said first and second quadrature signals processed by said first and second channels and for providing an output product signal corresponding to the product obtained thereby, and
    wherein said control means includes processing means for processing said output product signal of said multiplying means to provide a control voltage to said controlled delay means for establishing said loop phase shift.

4. An improved Doppler radar navigational system as recited in claim 3 further comprising switched multiplexing means for alternately providing said first and second quadrature signals to said first channel and for simultaneously alternately providing said second and first quadrature signals to said second channel to alternate repeatedly the channels processing said first and second quadrature signals, and
    switching means for switching said multiplexing means thereby providing to both of said processed quadrature signals substantially identical effects of mismatch between said first and second channels.

5. An improved Doppler radar navigational system as recited in claim 4 further comprising switched demultiplexing means receiving said alternating processed quadrature signals from said first and second channels and providing a first output signal corresponding to a first of said quadrature signals output by said controlled delay means and a second output signal corresponding to the second of said quadrature signals output by said controlled delay means,
    said switched demultiplexing means connected to be switched by said switching means in synchronism with said multiplexing means,
    thereby providing for said first output signal a signal which is at a high amplitude when said loop phase shift substantialy matches said relative phase shift and for said second output signal a signal which is at a lower amplitude than said first signal when said loop phase shift substantially matches said relative phase shift,
    said multiplying means connected to receive said first and second output signals from said demultiplexing means for providing said output product signal.

6. An improved Doppler radar navigational system as recited in claim 5, further comprising means for providing said first output signal, having a high amplitude when said loop phase shift substantially matches said relative phase shift, from said demultiplexing means to a frequency tracking portion of a velocity processing circuit of said Doppler navigational system,
    thereby improving accuracy of the velocity processing circuit.

7. An improved Doppler radar navigational system as recited in claim 3 wherein said first and second channels each include variable bandpass filters therein to increase accuracy of processing.

8. An improved Doppler radar navigational system as recited in claim 3 further comprising calibrating means for calibrating said output signal to compensate for phase shift caused by components other than said controlled delay means and included in said loop phase shift.

9. An improved Doppler radar navigational system as recited in claim 8, wherein said calibrating means comprises switching means for disconnecting a microwave generating means from an antenna used to transmit microwave energy in said Doppler radar navigational system,
    delay measuring means for measuring a delay between said microwave energy reflected means for measuring a delay between said generating means and said microwave energy generated by said microwave generating means, and correcting means for correcting said output signal by subtracting said measured delay from said loop phase shift indicated thereby.

10. An improved Doppler radar navigational system as recited in claim 9, wherein said calibrating means further comprises short circuiting means, said switching means operable for connecting said microwave generating means to said short circuiting means for measuring said delay, thereby correcting FM to AM Conversion by said microwave generating means.

11. An improved Doppler radar navigational system as recited in claim 10, further comprising timing means for periodically activating said switching means and said delay measuring means to cause periodic measurements of said delay and to provide periodic calibration of said altitude measuring circuit.

* * * * *